Figure 1:
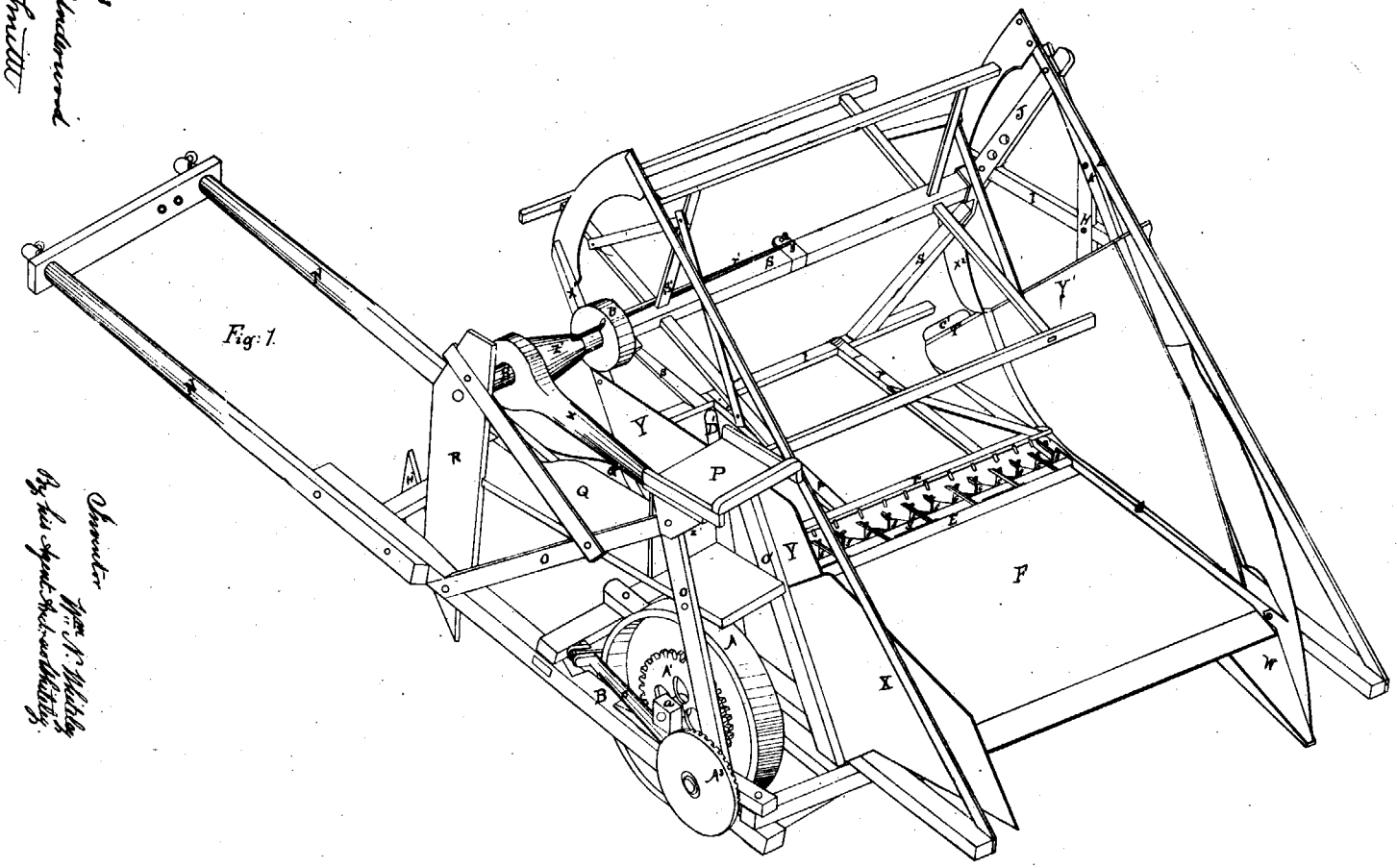

A. Whiteley.

Harvester Rake.

No 1757

Reissued Aug 30, 1864

Witnesses
D. M. Underwood
R. W. C. Smith

Inventor
Wm. N. Whiteley
By his Agent Andrew Whiteley.

Sheet 2 4 Sheets.
A. Whiteley.
Harvester Rake.
No 1757 Reissued Aug. 30, 1864.
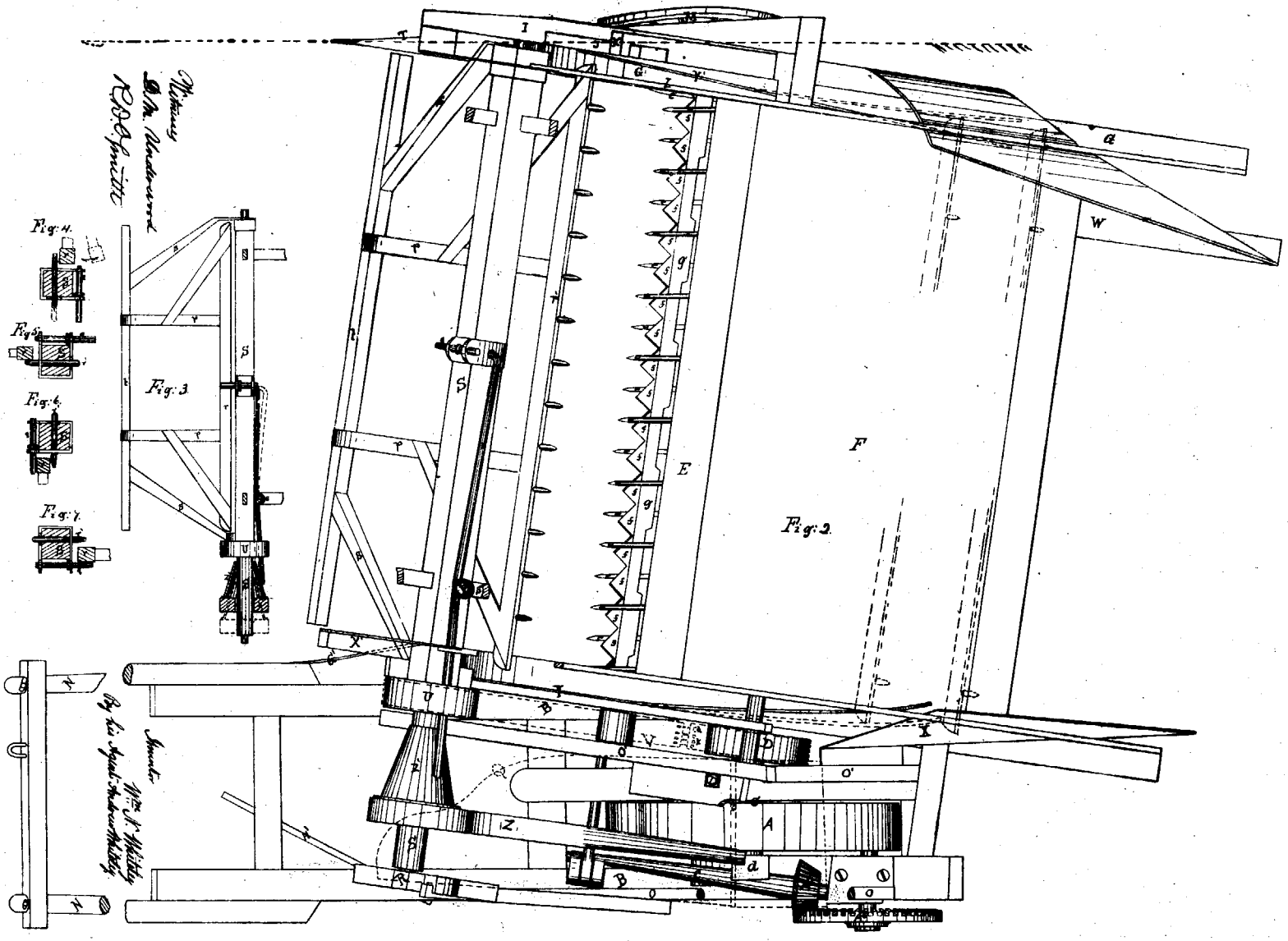
Witnesses
D. M. Underwood
R. D. C. Smith
Inventor
Wm. N. Whiteley
By his Agent Andrew Whiteley

A. Whiteley.
Harvester Rake.
No 1757 Reissued Aug. 30, 1864.
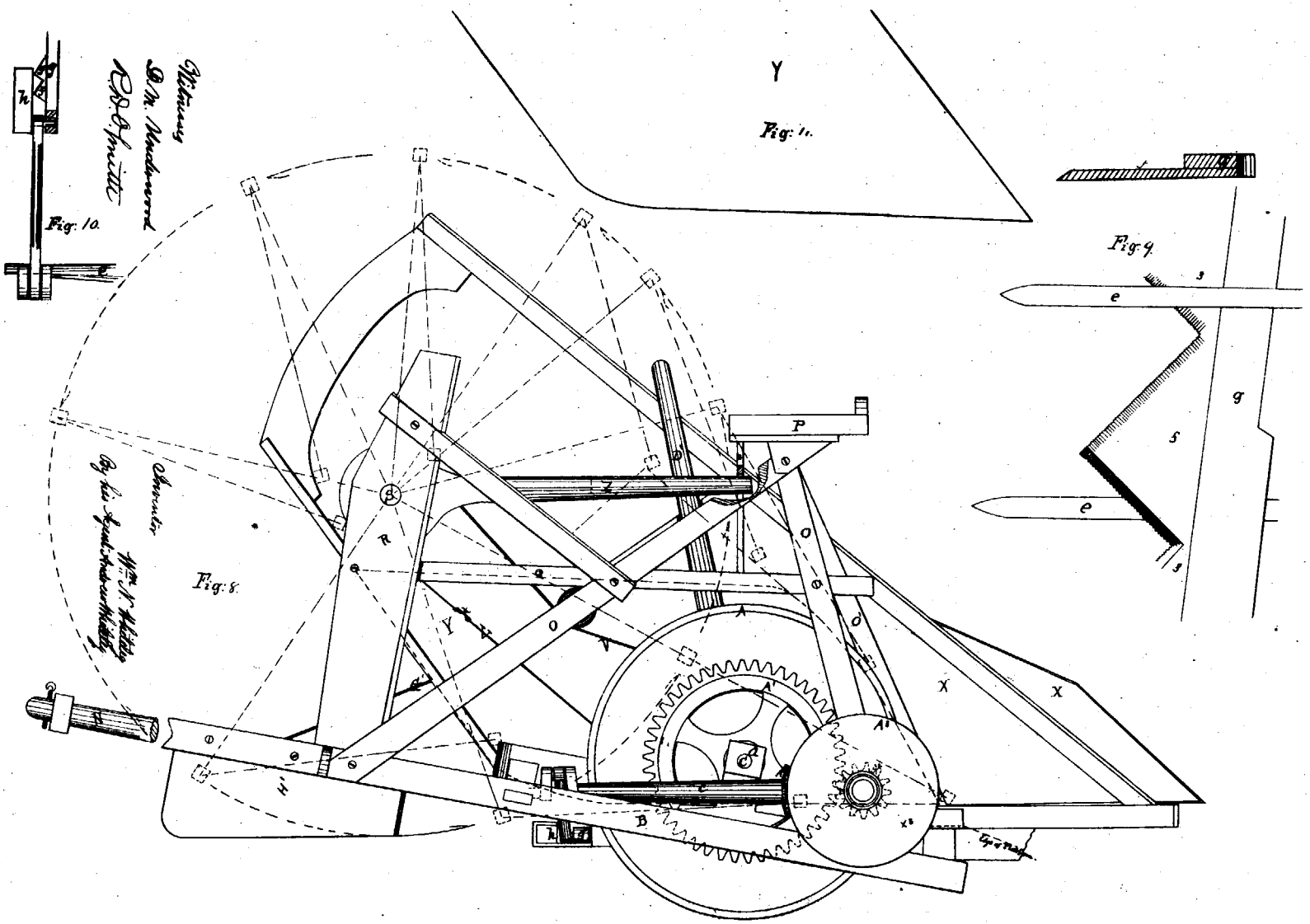
Witnesses
D. M. Underwood
R. D. O. Smith
Inventor
Wm. N. Whiteley
By his Agent Andrew Whiteley Sheet 4-4 Sheets.
A. Whiteley.
Harvester Rake.
No. 1757
Reissued Aug. 30, 1864.
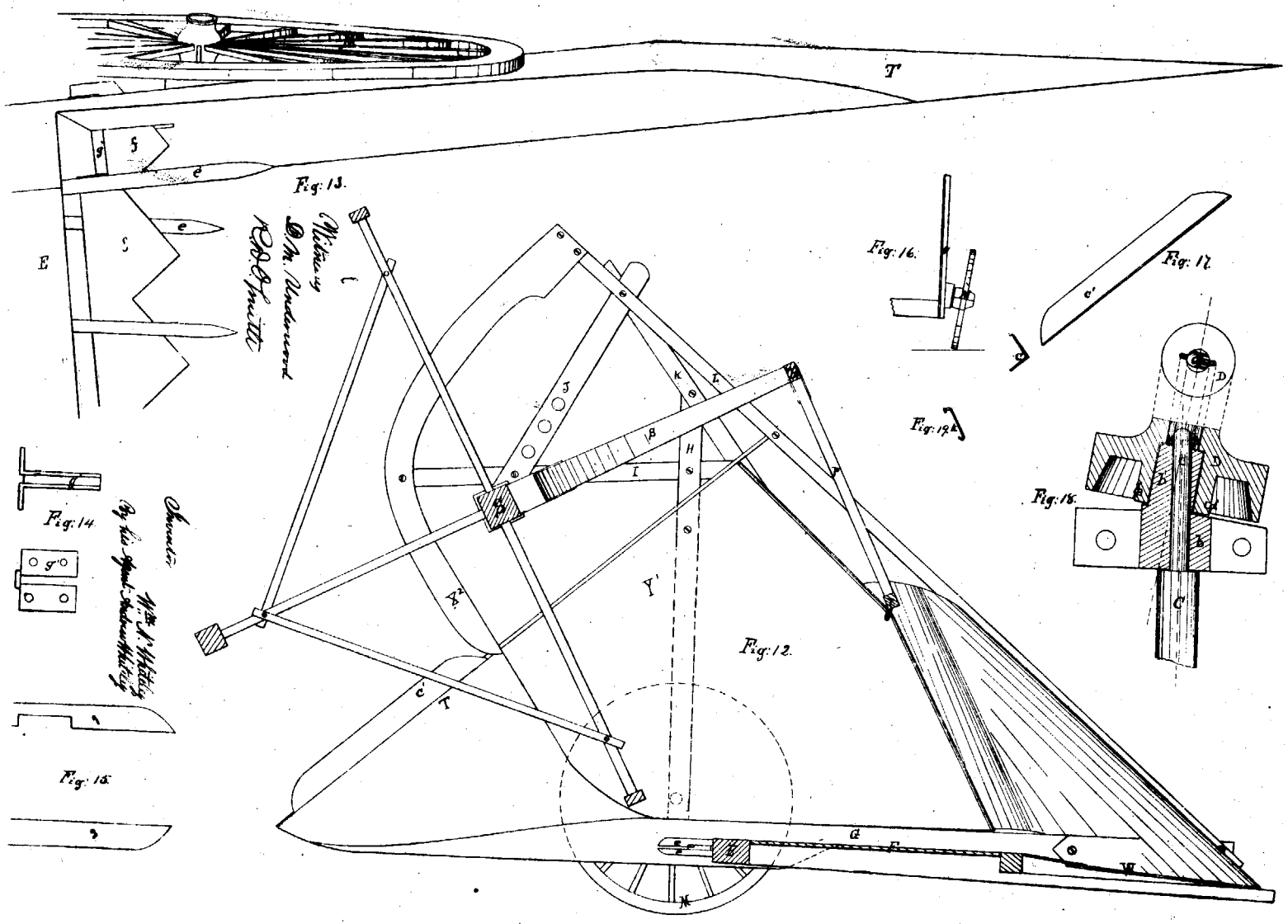

UNITED STATES PATENT OFFICE.

WM. N. WHITELEY, OF SPRINGFIELD, OHIO, ASSIGNEE OF ABNER WHITELEY, OF SAME PLACE.

IMPROVEMENT IN HARVESTERS.

Specification forming part of Letters Patent No. 12,769, dated April 24, 1855; Reissue No. 1,757, dated August 30, 1864.

*To all whom it may concern:*

Be it known that ABNER WHITELEY, of Springfield, in the county of Clarke and State of Ohio, invented several new and useful Improvements in Grain and Grass Harvesters; and I do hereby declare that the following is a full, clear, and exact description of the construction and operation of the same, reference being had to the accompanying drawings and the letters marked thereon, making a part of this specification, in which—

Figure 1 is a perspective view of the machine. Fig. 2 is a plan view of the same. Fig. 3 is a view of a portion of the reel, showing the attachment of the rake thereto. Figs. 4, 5, 6, and 7 are sectional views of the axle of the reel and of the manner of preventing the rake from removing the gavel when not made large enough at one revolution of the rake. Fig. 8 is an external view of the inner side of the machine. Fig. 9 is a plan view and a section of the cutter. Fig. 10 is a plan view of the crank-shaft, the pitman, its connection to the crank and also to the cutter-bar, and the peculiar manner of keeeping it in connection with the cutter-bar. Fig. 11 is a plan view of one of the spring-guides for the rake. Fig. 12 is an internal view of the outer side of the machine. Fig. 13 is a bottom plan view of the divider, grain-wheel, guard-fingers, cutters, &c. Fig. 14 is side and end views of the cutter's sheath. Fig. 15 is side views of the lower and upper guard-fingers. Fig. 16 is an elevation showing the position of the grain-wheel in respect to the plane of the platform. Fig. 17 is a side view of the cutter on the divider detached therefrom. Fig. 18 is a section illustrating the manner of attaching the driving-pulley of the reel to the axle of the driving-wheel, so as to have the pulley's shaft parallel with the reel-shaft when the wheel's axle is not parallel therewith. Fig. 19 shows one of the hooks for the reel-belt.

The nature of that part of said invention which is claimed under this patent, and the objects designed to be accomplished thereby, will best be understood from the following description of the several parts and their connections with each other.

To enable others skilled in the art to make and use said invention, I will proceed to describe its construction and operation.

That side of the machine which is at the left when behind and facing it I call its "inner" side, and that side at the right its "outer" side. That end of the finger-bar, platform-support, and reel-shaft which is connected to the inner side of the machine I call the "inner" end, and that end of each of said parts which is connected to the outer side of the machine I call the "outer" end.

A is the ground and driving wheel. B B′ are the side pieces of the main frame which surround this wheel, and which frame is sustained by the axle C, which revolves in the boxes *a* and *b*, secured to this frame. The cutter's driving-gears A′, $A^2$, $A^3$, and $A^4$ are secured to the main frame by their shafts and boxes, and are of the ordinary kind, except that the cog-wheels $A^3$ and $A^4$ are so shaped as to have the crank-shaft C lie and work properly at an angle to the vertical plane of A′. The driving-pulley D of the reel driven by the outer end of the axle C, has a peculiar connection therewith, as will be seen by reference to Fig. 18 of the drawings, where the extended part of the box *b* is formed into an axle, *b′*, parallel with the finger-bar and reel-shaft. On this shaft *b′* the pulley D is made to revolve by means of a clutch-pin, *d*, being passed through the axle C, where its vertical center crosses that of the vertical center of *b′* and fits the slot in the pulley D, in which it works. The inner end of the finger-bar E, (to which bar is secured the cutting apparatus,) and that of the beam, which, together with other framing thereby sustained, supports the platform F, is connected to the main frame in such a manner as to be oblique to the main frame, but at right angles to the cutter's driving crank-shaft *c*, as seen in Fig. 2 of the drawings. To the outer end of the finger-bar and the beam which supports the platform F is secured the outer side of the machine, the frame of which is composed of the divider G, the post H, the braces I, J, K, and L, as shown in Fig. 12 of the drawings. The cutter *c′* on the brace T or nose of the divider is for cutting through the vines and tangled grain which lie across its path.

*e e e e e e e e e e e e e e e e e e e* are the guard-fingers, a side view of a bottom one, marked 2, and a top one, marked 1, of which is seen in Fig. 15 of the drawings, and between the outer of said fingers and the divider is a longer one, *e'*, which stands at right angles to the finger-bar (while the other fingers are parallel to the machine's path) for separating that part of the crop cut between the outer finger and the divider into two parcels, and so that that part of the crop which stood next to that portion left standing may be cut a more uniform distance from the ground than it could be were this extra finger not used, and which extra finger need not be used unless desired. The upper one of said regular fingers, as will be seen at Fig. 15, has a shoulder in rear of the cutter-bar, against every alternate one of which shoulders the cutter-bar always bears, but changes that bearing from one to another of these shoulders every time the cutter-bar is moved inward or outward the length of its reciprocation, so as to let any clogging matter drop out below which has passed back over the cutter, the open spaces between the cutter-bar and the finger-bar, over the fingers under the cutter-bar, always permitting the clogging matter to pass away from the cutter-bar, and thus the cutters and cutter-bar are freed from the injurious effects of clogging matter remaining between them and the fingers.

*fffffffffffffffffff* are the sections of which the cutter is formed, the same in number (except the odd finger) as the fingers and divider, of the same length on the bar as the points or centers of the fingers are from each other, and secured to a cutter-bar, *g*, whose outer end terminates with the outer section of the cutter, and thus forms what I term a "short" cutter. By having the cutter thus constructed its outer end will be drawn farther inward when in its inner reciprocation than those parts of the divider against which the crop is cut, and thereby will allow the uncut crop to pass back of the cutting part of the outer edge of the cutter and prevent or impede its return outward. To obviate this difficulty the divider G, through which the slot is made, in which said outer edge of the cutter works, is placed so far inward that the outer end of the cutter (when in its inner reciprocation) will not be drawn out of said slot in the divider, and those parts of it against which the crop is cut cut away, as seen in Fig. 13, so much that there will be about the same space between said parts of the divider and the regular finger next to them as there is between two of the fingers, and so much as to make the upper of those parts against which the crop is cut of a less width than one-half the length of a section of the cutter, and be what I term a "narrow" divider, so that the grain-wheel may be placed the nearer to the end of said short cutter when said wheel's plane is opposite the end of said cutter, and thereby save running the point of the divider out so far for bringing the grain in front of the grain-wheel into the cutters, and which bringing in of said grain (in front of the grain-wheel) causes it to be cut farther from the ground than that part of it cut by any other of the cutters.

To prevent the wood from wearing away where the outer end of the cutter-bar works in the mortise in the divider's sill, a metal sheath, *g'*, (seen in Fig. 14,) is inserted into said mortise, and extended as far inward as the outer end of the cutter-bar is drawn when in its inner reciprocation.

On account of the finger-bar E being oblique to the machine's path and the guard-fingers *e* parallel therewith, it is necessary so to vary the angles of the right and left cutting parts of each section of the cutter as to make each cutting-edge of the cutter the same angle to the edges of the fingers, and it is also necessary when the cutters are to be used with guard-fingers which have every alternate one above, while the others are below, the cutter to make the sections of the cutters in pairs—that is, to bevel the adjoining edges of each adjoining section the same way, so that each adjoining edge of two sections will shear against the finger which they are reciprocated across, whether below or above the cutter.

In order to maintain the advantages gained by serrating the cutting parts of the cutter, and at the same time retain the principle of grinding the bevel side of said cutting parts and maintaining a close shear-edge, the sections of the cutter are either swaged down on the flat side so much that the chisel will but raise the highest parts of the serrations to the height or thickness that the section was before being serrated, or, if more, grind them down to the section's thickness, or cut the serrations with a sharp chisel sufficiently deep to remain of adequate depth when the parts raised thereby are ground down to the section's thickness, so that the serrated parts of the sections will not bear more against the fingers than the smooth parts do.

*h* is a guideway, as seen at Figs. 8 and 10, in which the inner end or heel of the cutter-bar slides, and with a part thereof in front of the connection of the pitman with the cutter-bar for holding said parts in connection with each other and in a better manner than they can be held by a key passed through the end of the pitman after in the hole in the cutter-bar, as said key is liable to be lost or wear out, and thus let the pitman out of the cutter-bar, so as to be broken.

The grain-wheel M has its connection to the post H made by a flat bar of iron having a series of large holes and a series of small ones cut therein, the large holes having screw-threads made in them and confining the bar to the post in such a manner that a plane vertical with the grain-wheel's axle will pass about through the vertical center of the master-wheel, making a hollow axle with a broad collar on its inner end, out of which projects a small stud, which will fit one of the smaller holes in the iron bar, and passing a joint-bolt through a large washer and then through said axle (after the wheel is on it) into one of the larger holes (when the stud is in one of the smaller holes,) and screwing it up tight. By this means of attaching the grain-wheel to the divider it is very quickly attached, or the height of the cutting apparatus at that end changed. By placing the grain-wheel axle substantially in the same vertical plane with the cutters, as seen in Fig. 12 of the drawings, the stubble will be cut of a much more uniform distance from the ground at the outer end of the cutting apparatus, where the surface is rough or undulating, than when said wheel is placed differently, as the wheel and cutting apparatus always rise and fall together; and, also, the entire machine is better balanced by thus placing the grain-wheel axle, but particularly the divider side, and the fingers are carried in a much more rigid position than they can be when the grain-wheel's axle is in rear of the finger-bar. By having the grain-wheel connected to the divider at the end of the cutter, as shown, and the cutter of the length hereinbefore stated, and the divider of the width stated where the cutter is reciprocated through it, the point of the divider requires to be set out a less distance than with any other arrangement of cutting apparatus which had the grain-wheel opposite the end of the cutter previous to the aforesaid invention, and the grain-wheel's tread within the space cleared by the point of the divider, so as not to run on the standing grain, and thereby the crop cut between said divider and regular finger next to it will be cut much nearer the same distance from the ground of that cut against the other fingers or the inner edge of this one (even when the extra finger is not used) than it can be by any other arrangement of parts which preceded the aforesaid invention.

N N are the shafts, between which the rear horse is harnessed to the machine, and with a cross-piece at their front end, in which is a hook, by which the front horse draws.

O O is an angular frame attached to B. O′ O′ is another frame of the same shape attached to B′. On the upper part of these frames is secured the driver's seat P, and at the proper distance below it, between O and O′, is secured the driver's foot-board Q, the front end of which is secured to the upright R, which has its lower end secured to the beam B, and the inner end of the reel-shaft S, which is parallel with the finger-bar, sustained by its upper end, while the outer end of S is sustained by J. From this shaft S are extended, at about right angles thereto, three pairs of arms, each pair from a different side, as ordinary reels have them, with a fan or gatherer on each pair for gathering and pressing the standing crop back to the cutting apparatus, while from the fourth side of the shaft S, as seen in Figs. 2, 3, and 12 of the drawings, are extended out in an oblique direction thereto two arms, *s s*, which serve as cranks for driving the rake *r*, and have on their outer ends the fan or gatherer *l*, which also serves as a wrist-pin for the cranks to which the rake *r* is connected by the pitmen *p p*. That one of the fans or gatherers opposite to the rake, as will be observed, is much heavier than the others for counterbalancing the weight of the rake.

U is the pulley on the reel-shaft S in line with the pulley D on the box and axle *b′*, and driven by the axle C, by having the belt V pass around them. The ends of this belt are connected together by hooks *k*, a side view of one of which is seen at Fig. 19 of the drawings.

W is the chute at the outer rear corner of the platform and rear of the outer side of the machine. By having this chute so constructed and connected to the outer rear corner of the platform and outer side of the machine as to form parts thereof, as shown at Figs. 1, 2, and 12 of the drawings, that part of the gavels cut by the outer end of the cutting apparatus will be carried farther before reaching the ground or stubble than that part of them cut by the inner end of said apparatus, and so far inward as to be out of the road of the horses and machine when cutting the next round.

X is a guide for the inner edge of the gavels. By having this guide connected to the inner side of the machine, as shown in Figs. 1 and 2 of the drawings, the width of the gavels is narrowed so much that they are bound with less labor than they could be were they not so narrowed as they are removed head foremost from the cutting apparatus over the platform.

X′ is the brace, to the front end of which is connected the rake's inner guide, which, together with the outer one, $X^2$, guides the rake *r* in its downward and backward movement through the standing grain, and backward over the platform after being drawn forward from where it is seen in Fig. 12 of the drawings, until it leaves the gavels after having passed them head foremost over and off the platform.

Y and Y′ are the spring-guides, which may be made either of metal or wood, and so attached to the side framing of the machine as to spring apart as the rake is moved backward between them, and inward again when it is in rear of them, so as to carry it upward and forward again to the position shown in Fig. 12 of the drawings.

By having the platform, reel, and automatic rake constructed and combined as herein shown and described, the rake is driven by the reel-shaft, is carried around with the reel, enters the standing crop in front of the cutting apparatus, and presses the crop backward thereto, and removes the gavels head foremost over the platform, out of the road of the horses and machine when cutting the next round.

The just-described arrangement of platform, reel, and automatic rake, although very essential and useful in a harvesting-machine, is lacking in one very essential element—that of a shipping mechanism for the rake, which enables the attendent to change the frequency of the gavel's removal, so as to make them of the proper size.

For supplying a harvester having the herein just described advantages with a shipping mechanism, which enables the attendant to have the rake so held as to remove the gavels from the platform less frequently where the grain is thin than where it is thick on the ground, and thereby make the gavels of a more uniform size than they would be were no such shipping mechanism used, the rear end of the knee-lever Z was inserted through a mortise in the board *z*, which forms a fulcrum for Z, on whose front was placed the cone *z'*, as seen in Fig. 2 of the drawings, which the attendant by the aid of the knee lever pushes outward, so as to force the outer and bent end of the rake-latch *r'*, which is pivoted at *s'* to S', out so much as to prevent the rake from reaching and following down the guides X' and $X^2$, the sliding pin *q* by its own weight sliding out and holding the rake from swinging out in the other direction until so high as not to interfere with the falling grain. The rake will be held in this manner until a gavel of the desired size will be formed by the time the rake reaches the butts of the gavel, at which time the latch is unlatched by pressing the knee-lever in the opposite direction until the rake is let loose to assume its regular motion.

The aforesaid machine, although having an automatic rake driven by the reel-shaft and removing the gavels head foremost over the platform out of the road of the horses and machine when cutting the next round, lacked a shipping mechanism for the reel, which enables the attendant to stop both the reel and the rake when the machine is being moved from place to place. To obviate this defect in said machine the lever D' had its forked and lower end so curved as to fit into the groove *d'* in the pulley D, and the fulcrum in the driver's foot board near its outer edge, so that he could take hold of the upper end of said lever and throw the slot in the pulley D off its clutch-pin *d* when he desires to stop the motion of the reel and onto it again when he wishes to start the reel in motion.

G' is a gather-board or compressor, which guides the inner portion of the standing crop into the cutters when the machine is driven too far into the grain.

H' is a scraper, which removes the butts of the gavels out of the road of the machine when it is driven too far from the standing grain.

From the description given of the aforesaid invention it is believed that any one familiar with the use of harvesters will be enabled to construct and use it.

What I claim under this patent as the invention of the aforesaid ABNER WHITELEY is—

1. The combination of the narrow divider, short cutter, and grain-wheel, arranged and operating substantially as herein described, for the purposes specified.

2. The combination of the narrow divider, short cutter, grain-wheel, and its adjusting mechanism, arranged and operating substantially as herein described, for the purposes specified.

3. The combination of the herein-described platform, reel, and automatic rake, or an equivalent of this combination, for the purposes specified.

4. The combination of the herein-described platform, reel, automatic rake, and counterbalance for the rake, or an equivalent of this combination, for the purposes specified.

5. The combination of the herein-described platform, reel, automatic rake, guides which guide and keep the rake in its proper path, or an equivalent of this combination.

6. The combination of the herein-described platform, reel, automatic rake, and shipping mechanism for the rake, or an equivalent of this combination, for the purposes specified.

7. The combination of the herein-described platform, reel, automatic rake, and shipping mechanism for the reel, or an equivalent combination, for the purposes specified.

8. The combination or arrangement of the following parts or elements in a harvester: the narrow divider, the short cutter, the grain-wheel at its end, the platform, the reel, and the automatic rake, herein described, so as to cut the grain in the best manner, remove the gavels in the best manner, and deposit them at the best place by one continuous automatic operation.

In witness whereof I have hereunto signed my name in presence of two witnesses.

WM. N. WHITELEY.

Witnesses:

DANL. ROWLAND,
JOSEPH SYKES.